(12) United States Patent
King

(10) Patent No.: US 6,917,305 B2
(45) Date of Patent: Jul. 12, 2005

(54) VEHICLE COLLISION SEVERITY ESTIMATION SYSTEM

(75) Inventor: Anthony Gerald King, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 10/065,215

(22) Filed: Sep. 26, 2002

(65) Prior Publication Data

US 2004/0061598 A1 Apr. 1, 2004

(51) Int. Cl.[7] ................................................. G08G 1/16
(52) U.S. Cl. ....................... 340/903; 340/901; 340/435; 340/436; 340/438
(58) Field of Search ........................... 340/901, 902, 340/903, 905, 435, 436, 438, 937; 382/100, 104, 107, 154; 701/70, 214, 301, 41, 45; 367/99, 109; 348/148, 169

(56) References Cited

U.S. PATENT DOCUMENTS

| | | | |
|---|---|---|---|
| 5,339,242 A | | 8/1994 | Reid et al. |
| 5,959,552 A | * | 9/1999 | Cho ........................... 340/903 |
| 6,173,224 B1 | | 1/2001 | Riesner et al. |
| 6,199,903 B1 | * | 3/2001 | Brambilla et al. .......... 280/735 |
| 6,300,866 B1 | | 10/2001 | Foith et al. |
| 6,327,536 B1 | * | 12/2001 | Tsuji et al. ................. 701/301 |
| 6,337,638 B1 | * | 1/2002 | Bates et al. ................. 340/904 |
| 6,359,553 B1 | * | 3/2002 | Kopischke .................. 340/436 |
| 6,370,475 B1 | * | 4/2002 | Breed et al. ................ 701/301 |
| 6,480,144 B1 | * | 11/2002 | Miller et al. ................. 342/72 |
| 6,593,873 B2 | * | 7/2003 | Samukawa et al. ........... 342/70 |

* cited by examiner

*Primary Examiner*—Hung Nguyen
(74) *Attorney, Agent, or Firm*—Frank A. MacKenzie; Artz & Artz, P.C.

(57) ABSTRACT

A collision severity estimation system (10) for an automotive vehicle (12) is provided. The system (10) includes one or more object detection sensors (22) detecting an object and generating a first object detection signal. A controller (20) is electrically coupled to the object detection sensors (22) and determines motion properties of the object relative to the vehicle (12) and generates an object motion signal in response to the first object detection signal. The controller (20) determines potential collision severity between the vehicle (12) and the object in response to the object motion signal and generates a collision severity signal. Methods of determining motion properties of the object as well as determining potential collision severity between the vehicle (12) and the object are also provided.

20 Claims, 3 Drawing Sheets

VEHICLE COLLISION SEVERITY ESTIMATION SYSTEM

BACKGROUND OF INVENTION

The present invention relates generally to collision mitigation and avoidance systems for automotive vehicles, and more particularly, to a method and system for estimating collision severity between a host vehicle and an impending target object during assessment of a potential collision event.

Collision warning and countermeasure systems are becoming more widely used. Collision warning systems and countermeasure systems can decrease the probability of and the energy imparted in a potential collision or injury. Collision warning systems provide a vehicle operator increased knowledge and awareness of threatening objects or vehicles within a close proximity so as to reduce the probability of colliding with those objects. Countermeasure systems exist in various passive and active forms. Some countermeasure systems are used to potentially decrease the energy of a collision, while others are used to aid in the prevention and reduction of injury to a vehicle operator.

Collision warning systems and countermeasure systems currently exist in various forms. Certain collision warning systems and countermeasure systems are able to sense a vehicle or object in a close proximity to a host vehicle and warn the host vehicle operator, such that the operator can take precautionary steps to prevent a collision or injury. Other collision warning systems and countermeasure systems activate passive or active countermeasures such as air bags, load limiting seat belts, or brake control whereby the system itself aids in preventing a collision or injury.

To further prevent injury, a better understanding and determination of collision severity is desired. Knowledge of collision severity corresponding to a potential collision event can allow for refined preventative countermeasure actions to be performed before the collision event occurs, over existing collision countermeasure systems, to further decrease the severity and probability of an injury.

A good estimate of collision severity between a host vehicle and an impending target object requires knowledge of velocities and masses of both the host vehicle and the target object. Upon determining the velocities and masses of the host vehicle and the target object, kinetic energy of each is ascertainable, which may then be related to collision severity of a potential collision event.

Velocity and mass of a host vehicle is readily obtainable. On the other hand velocity and mass determination of the target object is more difficult to obtain. Current active electro-magnetic wave ranging devices such as radar and lidar are capable of measuring velocity, but are incapable of measuring mass of the target object.

Therefore, it would be desirable to provide an improved safety countermeasure system for an automotive vehicle with increased collision severity intelligence.

SUMMARY OF INVENTION

The present invention provides a method and system for estimating collision severity between a host vehicle and a target object during assessment of a potential collision. A collision severity estimation system for an automotive vehicle is provided. The system includes one or more object detection sensors detecting an object and generating a first object detection signal. A controller is electrically coupled to the object detection sensors and determines motion properties of the object relative to the automotive vehicle and generates an object motion signal in response to the first object detection signal. The controller generates a collision severity signal indicative of a potential collision between the automotive vehicle and the object in response to the object motion signal.

A method of determining motion properties of the object is also provided. The method includes detecting an object and generating a first object detection signal. Velocity of the object, relative to the automotive vehicle, is determined in response to the first object detection signal and a first object velocity signal is generated. Visual parameters of the object are determined in response to the first object detection signal and an object parameter signal is generated. The motion properties of the object are determined in response to the first object velocity signal and the object parameter signal. A method of determining potential collision severity between the vehicle and the object is further provided.

One of several advantages of the present invention is the ability to estimate mass of a target object. Estimation of target object mass allows for determination of target object kinetic energy, which allows for determination of potential collision severity between the host vehicle and the target object. Collision severity prediction provides increased collision countermeasure system performance by allowing collision countermeasures to tailor its response according to the particular potential collision situation and thereby further preventing injury.

Another advantage of the present invention is system versatility and performance capability, through the use of one or more object detection sensors of various type and style. The combination of multiple sensor types reduces image-processing time and increases the number and accuracy of the measured object states and characteristics. This in turn increases measurement quality, which corresponds to better object classification and mass prediction.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

While the present invention is described with respect to a method and system for estimating collision severity between a host vehicle and a target object during assessment of a potential collision, the present invention may be adapted to be used in various systems including: automotive vehicle systems, control systems, hybrid-electric vehicle systems, or other applications utilizing active or passive countermeasure devices.

In the following description, various operating parameters and components are described for one constructed embodiment. These specific parameters and components are included as examples and are not meant to be limiting.

Figure 1:
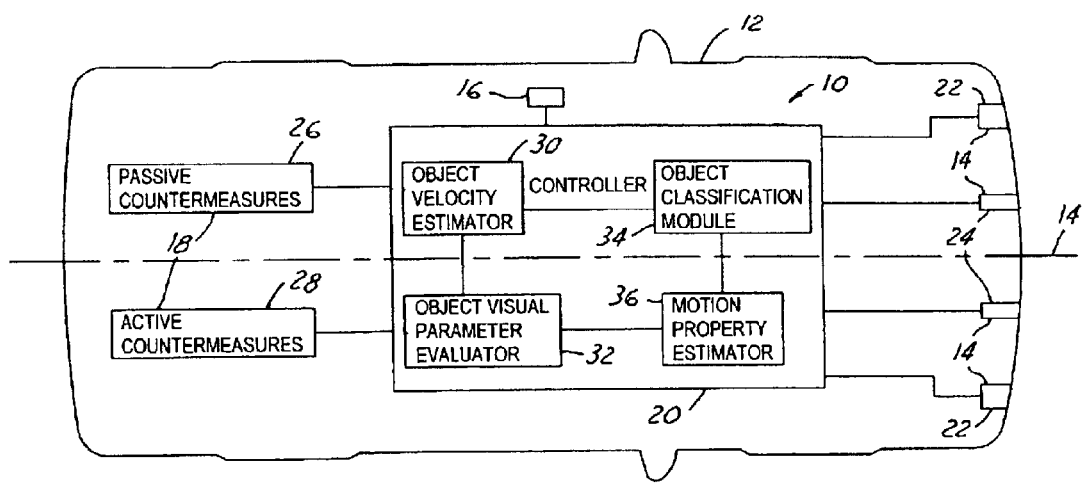
FIG. 1 is a block diagrammatic view of a vehicle collision severity estimation system for an automotive vehicle in accordance with an embodiment of the present invention.

Referring now to FIG. 1, a block diagrammatic view of a vehicle collision severity estimation system 10 for an automotive vehicle 12 in accordance with an embodiment of the present invention is shown. The system 10 includes one or more object detection sensors 14. The object detection sensors 14 as well as a host vehicle velocity sensor 16 and countermeasure systems 18 are electrically coupled to a controller 20. The controller 20 receives object detection signals from the object detection sensors 14 and a host vehicle velocity signal from the velocity sensor 16 and generates a collision countermeasure signal. The countermeasure devices 18 receive the collision countermeasure signal and perform a countermeasure prior to a collision event to mitigate or prevent injury during the collision event.

The object detection sensors 14 may include one or more cameras 22 and active electro-magnetic wave-ranging devices 24, or either alone. The cameras 22 may be robotic cameras or other visual imaging cameras known in the art. The cameras 22 may be used monocular or as a binocular (stereo) pair to obtain height, width, depth, distance, velocity, and any other visual feature information of a target object. The state of the art today requires a stereo pair of cameras to accurately determine distance and velocity. This however adds both cost and complexity to the system. The wave-ranging devices 24 may include radar, lidar, cameras with active infrared illumination, or other known wave-ranging devices known in the art. The wave-ranging devices 24 may also detect height, width, depth, distance and velocity information of a detected object. As opposing to the cameras 22 the wave-ranging devices 24 have different cost and performance limitations. Due to costs of various wave-ranging devices, present wave-ranging devices that are capable of accurately determining object height are impractical for vehicle production. Also, accuracy of inexpensive wave-ranging devices, in determining width of an object, is low due to poor clarity. Therefore, practical use of wave-ranging devices is limited to determining distance and velocity, and coarse width, of an object.

Thus, one envisioned embodiment of the present invention includes the use of one or more cameras 22 for height and width and visual feature information and the use of wave-ranging devices 24 to determine velocity information of the target object. The cameras 22 generate a first object detection signal for a potentially collidable target object, which contains the height and width information. Target object information such as visual cues and features is also obtainable from the first object detection signal. The wave-ranging devices 24 generate a second object detection signal upon detecting a potentially collidable target object. The second object detection signal contains velocity information of the target object. The target object velocity information includes distance between the host vehicle 12 and the target object, range rate of the target object relative to the host vehicle 12, and angle of the target object relative to a centerline A of the host vehicle 12.

System 10 is versatile in that various combinations of object detection sensors and sensor types may be utilized to satisfy various applications. Existing automotive vehicle existing object detection sensors, may also be used, minimizing the amount of addition vehicle components necessary for system 10 to operate. The combination of multiple sensor types also reduces image-processing time and increases image quality of the target object as observed from the controller 20 through the use of the object detection sensors 14.

The velocity sensor 16 may be of various type and style known in the art. The velocity sensor 16 may be a rotational sensor located on an engine, a transmission, an axle, a wheel, or other component of the host vehicle 12 as to determine traveling velocity of the host vehicle 12. Or, the sensor may be a linear accelerometer.

The controller 20 is preferably microprocessor based such as a computer having a central processing unit, memory (RAM and/or ROM), and associated input and output buses. The controller 20 may be a portion of a central vehicle main control unit, an interactive vehicle dynamics module, a restraints control module, a main safety controller, or a stand-alone controller.

The countermeasure systems 18 may include passive countermeasure systems 26 or active countermeasures systems 28. The passive countermeasure systems 26 may include internal air bag control, seatbelt control, knee bolster control, head restraint control, load limiting pedal control, load limiting steering control, pretensioner control, external air bag control, and pedestrian protection control. Pretensioner control may include control over pyrotechnics and seat belt pretensioners. Air bag control may include control over front, side, curtain, hood, dash, or other type air bags. Pedestrian protection control may include controlling a deployable vehicle hood, a bumper system, or other pedestrian protective devices. The active countermeasure systems 28 may include brake control, throttle control, steering control, suspension control, transmission control, and other chassis control systems.

The controller 20 includes an object velocity estimator 30, an object visual parameter evaluator 32, object classification module 34 and a motion property estimator 36. The velocity estimator 30, the parameter evaluator 32, the classification module 34, and the motion property estimator 36 may be software or hardware based components. The object velocity estimator 30 determines velocity of the object relative to the host vehicle 12 in response to the first object detection signal and generates a first object velocity signal. The object visual parameter evaluator 32 determines a visual parameter of the object in response to the first object detection signal and generates an object parameter signal. The classification module 34 determines a classification of the target object in response to the object parameter signal and generates a classification signal. The motion property estimator 36 determines motion properties of the object in response to the first object velocity signal and the classification signal and generates an object motion signal.

Figure 2:
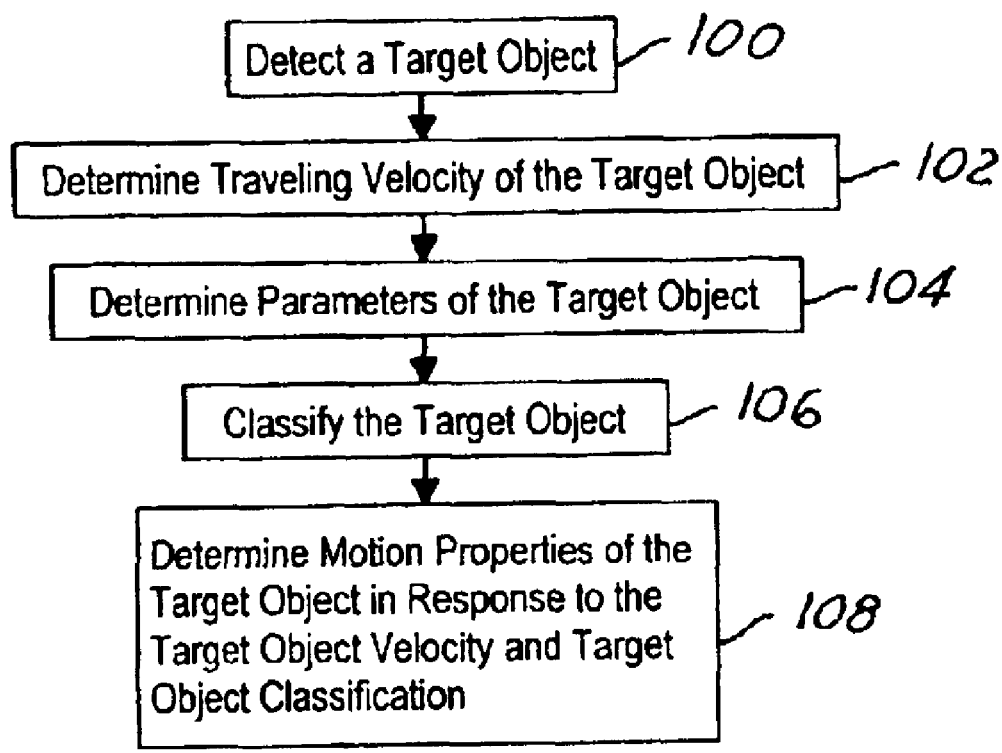
FIG. 2 is a logic flow diagram illustrating a method of determining kinetic energy of an object relative to an automotive vehicle in accordance with an embodiment of the present invention.

Referring now to FIG. 2, a logic flow diagram illustrating a method of determining motion properties of an object relative to the host vehicle 12 in accordance with an embodiment of the present invention, is shown.

In step 100, the cameras 22 and the wave-ranging devices 24 detect a target object and generate the first object detection signal and the second object detection signal, respectively. The target object may be any one or more of the following: a target vehicle, a stopped object, a moving object, a bridge, construction equipment, a sign, an animate or inanimate object, or other object.

In step 102, the velocity estimator 30 determines traveling velocity of the target object relative to the host vehicle 12 in response to the second object detection signal and generates an object velocity signal.

In step 104, the parameter evaluator 32 determines one or more parameters of the target object in response to one or both of the first object detection signal and the second object detection signal and generates an object parameter signal.

The parameters may include object height, object width, object depth, a surface shape of the object, or other visual or non-visual object characteristics.

In step 106, the target object is classified and a classification signal is generated. An indefinite amount of classes may be created within the controller 20. The classes may be identified using information contained within the object parameter signal such as size, shape, visual cues, visual features, or other object characteristics, which may then be correlated to various objects. For example, mass of objects in a particular class may have a given average range of mass values that correlate to a particular vehicle classification such as heavy-duty trucks, automobiles, or motorcycles.

In one embodiment of the present invention, the object classes are identified by average cross-sectional areas or volumes of objects in each particular class. An area signal or a volume signal is generated in response to the object parameter signal. Height, width, and depth information are used as perceived from the object detection sensors 14 to determine area or volume of the target object to predict mass of the target object and generate an object mass signal in response to the area signal or the volume signal. The controller 20 may estimate the mass of the target object through the use of look-up tables containing the object classes corresponding to various object parameters and characteristics.

In step 108, the motion property estimator 34 determines motion properties of the target object in response to the first object velocity signal and the object parameter signal. Motion properties of the target object is determined in response to the object velocity signal and the object mass signal. Motion properties include mass and velocity of an object or any combination thereof. The motion properties in that they may be any combination of mass and velocity may also be kinetic energy or momentum. The object class is multiplied by the square of the object velocity to generate kinetic energy or momentum of the target object. The kinetic energy or momentum of the target object is directly related to the potential collision severity of a predicted collision event between the host vehicle 12 and the target object.

Figure 3:
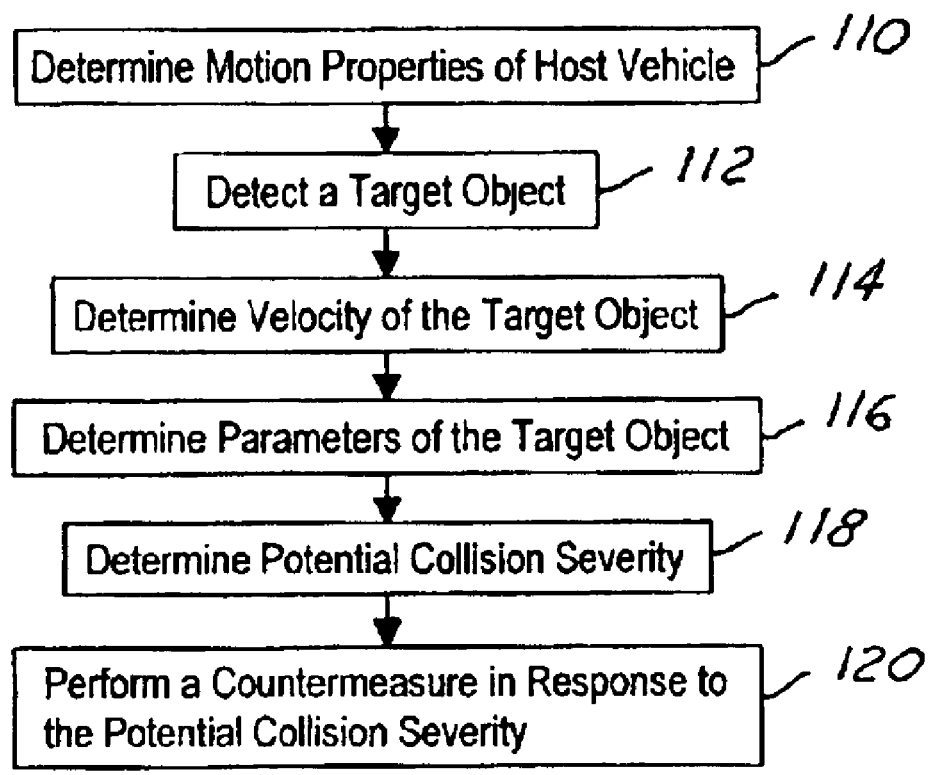
FIG. 3 is a logic flow diagram illustrating a method of performing a collision countermeasure within an automotive vehicle in accordance with another embodiment of the present invention.

Referring now to FIG. 3, a logic flow diagram illustrating a method of performing a collision countermeasure within the host vehicle 12 in accordance with an embodiment of the present invention, is shown.

In step 110, motion properties of the host vehicle 12 are determined and a vehicle motion signal is generated. Kinetic energy or momentum of the host vehicle 12 is determined by multiplying a known mass of the host vehicle 12 by the squared traveling velocity of the host vehicle 12.

In step 112, a target object is detected and an object detection signal is generated as described above, in step 100.

In step 114, velocity of the target object is determined in response to the object detection signal and an object velocity signal is generated as stated above, in step 102.

In step 116, one or more parameters of the target object are determined and an object parameter signal is generated as described in step 104.

In step 118, potential collision severity of the host vehicle 12 and the target object in response to the vehicle motion signal, the object velocity signal, and the object parameter signal is determined and a collision severity signal is generated. The difference in kinetic energy or momentum of the host vehicle 12 and the kinetic energy or momentum of the target object is multiplied by a class severity rating to determine collision severity. The kinetic energies or momentums are directly related to the collision severity such that the larger the resulting difference between the kinetic energies or momentums of the host vehicle 12 and the target object, the larger the collision severity.

In step 120, the controller 20 performs or activates a collision countermeasure 18 in response to the collision severity signal. The collision countermeasure 18 may be a passive countermeasure 26 or an active countermeasure 28 as described above.

The above-described steps in FIGS. 2 and 3 are meant to be an illustrative example, the steps may be performed synchronously or in a different order depending upon the application. The steps may also be altered to perform similar or related operations, which is also dependent upon the application.

The present invention therefore provides an improved collision countermeasure system. In predicting kinetic energy of an impending object the present invention activates collision countermeasures in a refined manner as to provide improved injury prevention. Thereby, potentially increasing safety of an automotive vehicle.

The above-described apparatus, to one skilled in the art, is capable of being adapted for various purposes and is not limited to the following systems: automotive vehicle systems, control systems, hybrid-electric vehicle systems, or other applications utilizing active or passive countermeasure devices. The above-described invention may also be varied without deviating from the spirit and scope of the invention as contemplated by the following claims.

What is claimed is:

1. A collision severity estimation system for an automotive vehicle comprising:

one or more object detection sensors detecting an object and generating at least one object detection signal; and a controller electrically coupled to said one or more object detection sensors determining motion properties, comprising kinetic energy, of said object relative to the automotive vehicle and generating an object motion signal in response to said at least one object detection signal;

said controller determining depth of said object in response to said at least one object detection signal and generating a collision severity signal indicative of a potential collision between the automotive vehicle and the object in response to said object motion signal and said depth.

2. A system as in claim 1 wherein said controller comprises:

an object velocity estimator detemining velocity of said object relative to the automotive vehicle in response to said at least one object detection signal and generating a first object velocity signal;

an object visual parameter evaluator generating an object parameter signal in response to said first object detection signal;

an object classification module generating an object classification signal in response to said object parameter signal; and a motion property estimator generating said object motion signal in response to said first object velocity signal and said object classification signal.

3. A system as in claim 2 wherein said controller in generating said object motion signal determines said kinetic energy or momentum of said object.

4. A system as in claim 1 further comprising:

a collision countermeasure electrically coupled to said controller; and said controller activating said collision countermeasure in response to said collision severity signal.

5. A system as in claim 1 further comprising:
one or more active electro-magnetic wave-ranging devices detecting said object and generating a wave-ranging device object detection signal; and
said controller electrically coupled to said one or more active electro-magnetic wave-ranging devices generating said object motion signal in response to said at least one object detection signal and said wave-ranging device object detection signal.

6. A system as in claim 5 wherein said controller in generating said collision severity signal determines height and width information of said object in response to said at least one object detection signal and determines said depth and velocity of said object in response to said wave-ranging device object detection signal.

7. A system as in claim 5 wherein said active electro-magnetic wave-ranging devices are integrally incorporated within at least one of the following: a radar system, a lidar system, a monocular camera, or a stereo camera pair.

8. A system as in claim 1 wherein at least one of said one or more object detection sensors is a camera.

9. A system as in claim 1 further comprising:
a velocity sensor electrically coupled to said controller and generating a host vehicle velocity signal; and
said controller generating said collision severity signal in response to said object motion signal and said host vehicle velocity signal.

10. A method of determining motion properties of an object from within an automotive vehicle comprising:
detecting the object via at least one camera and generating a first object detection signal;
detecting the object via at least one wave-ranging device and generating a second object detection signal;
determining velocity of the object relative to the automotive vehicle in response to said second object detection signal and generating a first object velocity signal;
determining a visual parameter of the object in response to said first object detection signal and generating an object parameter signal; and
determining motion properties, comprising kinetic energy, of the object in response to said first object velocity signal and said object parameter signal;
wherein determining motion properties of the object comprises:
classifying the object and generating a classification signal in response to said object parameter signal; and
estimating mass of the object in response to said classification signal.

11. A method as in claim 10 further comprising:
determining velocity of the object relative to the automotive vehicle in response to said first object detection signal and generating a second object velocity signal; and
determining motion properties of the object in response to said second object velocity signal and said object parameter signal.

12. A method as in claim 10 wherein determining a visual parameter of the object is in response to said first object detection signal and said second object detection signal.

13. A method as in claim 10 wherein said visual parameter is at least one of an object height, an object width, an object depth, and a surface shape or characteristic of said object.

14. A method as in claim 10 further comprising:
estimating area of said object and generating an area signal in response to said object parameter signal;
estimating said mass and generating an object mass signal in response to said area signal; and
determining motion properties of said object in response to said object velocity signal and said object mass signal.

15. A method as in claim 10 further comprising:
estimating volume of said object and generating a volume signal in response to object parameter signal;
estimating mass of said object and generating an object mass signal in response to said volume signal; and
determining motion properties of said object in response to said object velocity signal and said object mass signal.

16. A method as in claim 10 wherein determining a visual parameter is performed via only said at least one camera and wherein determining velocity of the object is performed via only said at least one wave-ranging device.

17. A method of performing a collision countermeasure within an automotive vehicle comprising:
determining motion properties of the automotive vehicle and generating a vehicle motion signal;
detecting an object and generating an object detection signal;
determining velocity of said object in response to said object detection signal and generating an object velocity signal;
determining at least one visual parameter comprising object depth of said object and generating an object parameter signal;
determining mass of said object in response to said object parameter signal;
determining potential collision severity of the automotive vehicle and said object in response to said vehicle motion signal, said object velocity signal, said object parameter signal, and said mass and generating a collision severity signal; and
performing a collision countermeasure in response to said collision severity signal.

18. A method as in claim 17 wherein determining potential collision severity comprises:
classifying said object in response to said object parameter signal and generating a classification signal; and
determining motion properties of said object in response to said classification signal.

19. A method as in claim 17 wherein determining potential collision severity of the automotive vehicle and said object comprises multiplying the difference in a motion property of the automotive vehicle and a motion property of said object by a class severity rating.

20. A method as in claim 17 wherein performing a collision countermeasure comprises performing a passive or active countermeasure.

* * * * *